(12) United States Patent
Kuwajima et al.

(10) Patent No.: US 7,265,939 B2
(45) Date of Patent: Sep. 4, 2007

(54) SPINDLE MOTOR AND DISK DRIVE UNIT (75) Inventors: Hideki Kuwajima, Kyoto (JP); Kaoru Matsuoka, Osaka (JP); Shigeo Obata, Hyogo (JP); Kenichi Miyamori, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 366 days.

(21) Appl. No.: 10/811,895

(22) Filed: Mar. 30, 2004

(65) Prior Publication Data

US 2004/0190410 A1   Sep. 30, 2004

(30) Foreign Application Priority Data

Mar. 31, 2003   (JP) .............................. 2003-094956

(51) Int. Cl.
*G11B 17/02* (2006.01)
*H02K 7/00* (2006.01)
*H02K 5/16* (2006.01)

(52) U.S. Cl. .................................. 360/99.08; 360/98.07
(58) Field of Classification Search ................ 384/100, 384/107, 120, 123; 360/98.07, 99.08; 310/67 R, 310/90
See application file for complete search history.

(56) References Cited

U.S. PATENT DOCUMENTS

| | | | |
|---|---|---|---|
| 5,430,589 A * | 7/1995 | Moir et al. ............... | 360/97.02 |
| 5,483,397 A * | 1/1996 | Gifford et al. ........... | 360/97.01 |
| 5,504,637 A * | 4/1996 | Asada et al. ............. | 360/98.07 |
| 5,667,309 A * | 9/1997 | Nose ........................... | 384/132 |
| 5,825,585 A * | 10/1998 | Hatam-Tabrizi ......... | 360/97.02 |
| 6,211,592 B1 | 4/2001 | Ichiyama | |

(Continued)

FOREIGN PATENT DOCUMENTS

EP    0 392 500 A2    10/1990

(Continued)

OTHER PUBLICATIONS

English-Machine Translation of JP 05-060135 A.*

(Continued)

*Primary Examiner*—William J Klimowicz
(74) *Attorney, Agent, or Firm*—McDermott Will & Emery LLP (57) ABSTRACT

Disclosed is a spindle motor and a disk drive unit equipped with the same, having advantages of preventing hard collision between a disk and a signal conversion element due to lifting of rotating components, and avoiding the signal conversion element and swing means for positioning the signal conversion element from being damaged irreparably. Specifically, spindle motor 13 comprises rotor unit 5, stator 11, stator-side bearing member 6 in engagement with rotor-side bearing member 3 to form a shaft rotating type fluid bearing, and chassis 8. Rotor hub 2 has hollow cylinder portion 2a near central axis 1 of rotation, and cylindrical portion 7b of support column 7 secured to chassis 8 is positioned inside the hollow space of cylinder portion 2a without being in contact thereto. Cover 18 is placed with a bottom side of abutment portion 18b kept in abutment upon an upper end of cylindrical portion 7b of support column 7 with a predetermined small clearance provided between upper end 2c of rotor hub 2 and the bottom side of abutment portion 18b.

14 Claims, 8 Drawing Sheets

U.S. PATENT DOCUMENTS

| | | |
|---|---|---|
| 6,371,650 B1 | 4/2002 | Goto et al. |
| 7,023,657 B2 * | 4/2006 | Sohn et al. ............... 360/99.08 |
| 2003/0132676 A1 * | 7/2003 | Hirose et al. .................. 310/90 |
| 2004/0042695 A1 * | 3/2004 | Shishido et al. ............ 384/107 |

FOREIGN PATENT DOCUMENTS

| | | | | |
|---|---|---|---|---|
| EP | 769628 | A1 | * | 4/1997 |
| JP | 05060135 | A | * | 3/1993 |
| JP | 6-233495 | | | 8/1994 |
| JP | 8-275447 | | | 10/1996 |
| JP | 9-247886 | | | 9/1997 |
| JP | 10125053 | A | * | 5/1998 |
| JP | 11-55900 | | | 2/1999 |
| JP | 2000076827 | A | * | 3/2000 |
| JP | 2000316249 | A | * | 11/2000 |
| JP | 2001202682 | A | * | 7/2001 |
| JP | 2002-286038 | | | 10/2002 |
| JP | 2002295461 | A | * | 10/2002 |

OTHER PUBLICATIONS

European Search Report issued in corresponding European Patent Application No. 06023079.4-2207, dated Apr. 5, 2007.

* cited by examiner

SPINDLE MOTOR AND DISK DRIVE UNIT

FIELD OF THE INVENTION

The present invention relates to a spindle motor used for a magnetic disk drive, optical disk drive and the like for recording and reproducing data in high density, and a disk type recording and reproducing device (hereinafter referred to as a disk drive unit) equipped with the spindle motor.

BACKGROUND OF THE INVENTION

Referring now to the accompanying drawings, description is provided of a conventionally available spindle motor and a disk drive unit of the prior art.

Figure 8:
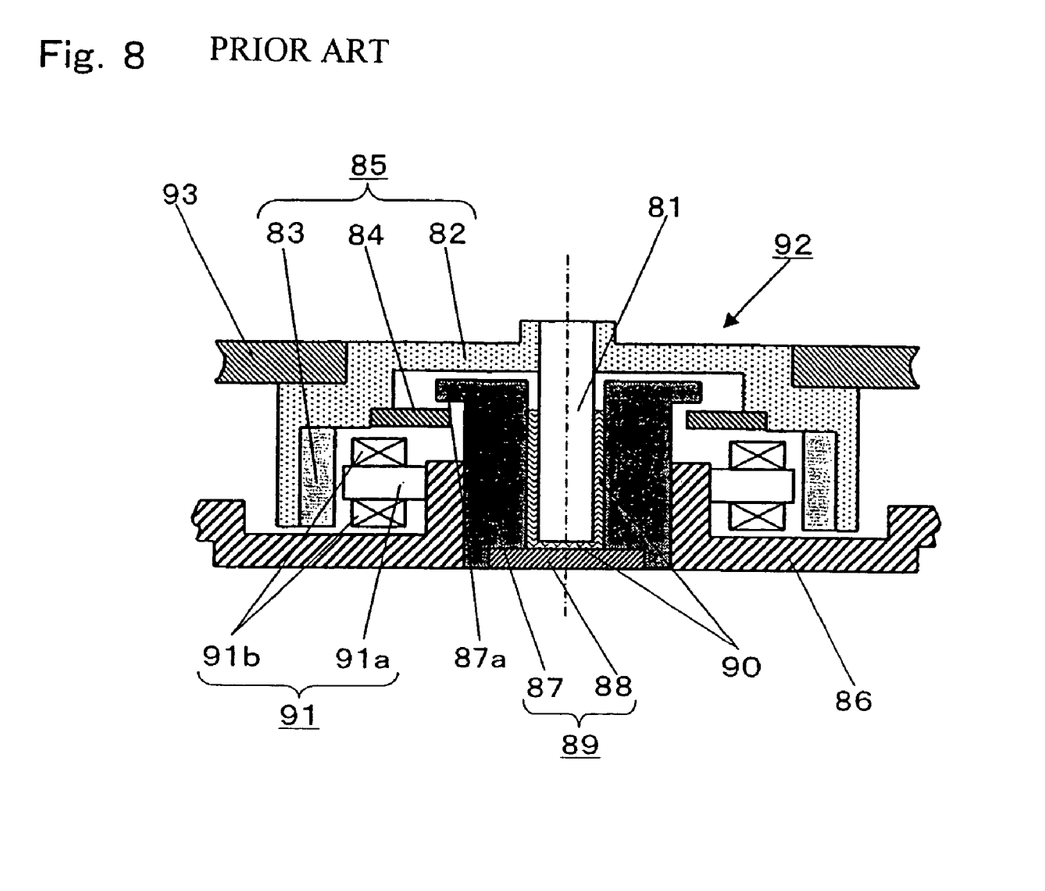
FIG. 8 is a sectioned side view showing a general structure of major components of a disk drive unit equipped with a spindle motor of the prior art.

FIG. 8 is a sectional side view showing a general structure of the disk drive unit equipped with a conventional spindle motor. In this figure, the disk drive unit is sectioned along a plane including a rotor shaft to illustrate the main structure of the disk drive unit equipped with the spindle motor.

In FIG. 8, rotor hub 82 is fixed to rotor shaft 81 by such means as press fitting and the like. Rotor hub 82 constitutes rotor unit 85 together with rotor magnet 83 and annular stopper ring 84, both of which are mounted to rotor hub 82. Stator-side bearing member 89, securely fixed to chassis 86, comprises bearing sleeve 87 having protruded flange 87a of a collar like shape and thrust plate 88 fixed to bearing sleeve 87. Rotor shaft 81 is formed in its surface with a dynamic pressure generating groove in a shape of herringbone pattern or the like, and it is inserted into a bore in the stator-side bearing member 89 with a very small clearance. Rotor shaft 81 and stator-side bearing member 89 compose a fluid bearing which functions as a radial bearing, and stator-side bearing member 89 rotatably supports the rotor shaft 81 in the radial direction. In addition, the thrust plate 88 constituting the stator-side bearing member 89 also has a dynamic pressure generating groove of herringbone pattern or the like formed in it. Thrust plate 88 thus composes a thrust bearing to support the rotor shaft 81 in a freely rotatable manner in the axial direction by a dynamic pressure generated between the bottom end of the rotor shaft 81 and the thrust plate 88 during rotation of the rotor shaft 81. A space formed of the small clearance between rotor shaft 81 and the stator-side bearing member 89 composed of bearing sleeve 87 and thrust plate 88 is filled with hydrodynamic lubricant 90. Furthermore, the chassis 86 is provided with stator 91 comprising coil 91b wound around stator core 91a, to complete the spindle motor 92.

Disk 93 having a recording layer (also called a recording film instead of recording layer) formed on the surface thereof is secured to a flange portion of rotor hub 82. Also provided are a signal conversion element (not shown in the figure) and swing means (not shown) for positioning the signal conversion element, as are well known, and all of the above components constitute the disk drive unit for recording and reproducing signals in and from the recording layer on disk 93.

Stopper ring 84 attached to rotor unit 85 composes a means for positively preventing the rotor unit 85 from slipping out of the stator-side bearing member 89, since the stopper ring 84 attached to the rotor unit 85 comes into sliding contact with the protruded flange 87a of the bearing sleeve 87, even if the disk drive unit receives an excessive impact and the like (refer to Japanese Patent Laid-open Publications, Nos. H08-275447, H11-055900, H06-233495 and H09-247886, for example).

The conventional spindle motor 92 of the above structure, however, has a problem that the assembling process is very complex due to a dimensional relation in which an inner diameter of the annular stopper ring 84 is smaller than an outer diameter of the protruded flange 87a of the bearing sleeve 87. In other words, the rotor shaft 81 is inserted first into the bore in the stator-side bearing member 89 composed of bearing sleeve 87 and thrust plate 88, after the rotor magnet 83 is secured to rotor hub 82 carrying the rotor shaft 81 attached thereto, and, only then the annular stopper ring 84 is fixed to the rotor hub 82 by any of the well-known methods such as bonding with adhesive, press-fitting, caulking, laser welding and the like, while the stator-side bearing member 89 carries hydrodynamic lubricant 90 filled in the space in which the rotor shaft 81 is inserted. During these processes, certain problems occur such that refuse of adhesive used for bonding, metal dust produced and spattered by press-fitting, caulking, or welding may be left attached to or caught between bearing sleeve 87 and rotor unit 85. Another problem may also occur in the reliability of adhesive when used for bonding, that hydrodynamic lubricant 90 remaining on surfaces of the rotor hub 82 reduces bonding strength of the adhesive. Furthermore, a pressure is transferred to the bearing sleeve 87 through the thrust plate 88 because a depressing force is impressed upon the upper end of rotor shaft 81 in the axial direction, if press-fitting method is used to fix the stator-side bearing member 89 assembled with the rotor unit 85 to chassis 86. This causes a damage of compression and the like to at least one of thrust plate 88 and rotor shaft 81 where they come into abutment, or loosens the thrust plate 88 fixed to the bearing sleeve 87, which is likely to lead into leakage of the hydrodynamic lubricant 90 contained in the radial bearing and the thrust bearing serving as fluid bearing. Moreover, if adhesive is used for fixing the stator-side bearing member 89 to the chassis 86, there is a possibility that refuse of the adhesive remains in the spindle motor, for the same reason as in the case of stopper ring 84, which gives rise of another problem of failing to ensure the reliability.

SUMMARY OF THE INVENTION

The present invention addresses the above problems, and it aims to provide a spindle motor, which can be assembled with simple assembling processes, and has a structure that can prevent a rotor unit from being disengaged from a stator-side bearing member even under excessive shocks and the like, and eliminate a hard collision between a disk and a signal conversion element due to an excessive jumping of the rotor unit, thereby avoiding an irreparable damage to the signal conversion element and swing means for positioning of the signal conversion element. It is also an object of this invention to provide a disk drive unit equipped with the above spindle motor.

To achieve the above object, the spindle motor of this invention comprises a chassis, a rotor magnet, a rotor-side bearing member, a rotor hub having a hollow circular opening disposed in the center of rotation, a support column secured to the chassis, and a stator having a wound coil and disposed to the chassis in a manner to confront the rotor magnet, wherein the support column is so placed in the chassis that it lies inside the hollow circular opening of the rotor hub, and a bearing for supporting the rotor hub and comprising a stator-side bearing member disposed to the chassis and the rotor-side bearing member is formed in a position of a certain distance from the support column. The bearing serving as a fluid bearing has a structure comprising a dynamic pressure generating groove formed in one of two axially confronting surfaces of the rotor-side bearing member and the stator-side bearing member, and another dynamic pressure generating groove formed in one of two radially confronting surfaces of the rotor-side bearing member and the stator-side bearing member. The two dynamic pressure generating grooves function as a thrust bearing and a radial bearing respectively. The rotor hub and the rotor-side bearing member are formed integrally. The support column securing the stator-side bearing member has a flat portion and a cylindrical portion made of separate materials, which are constructed integrally into one component. Alternatively, the support column securing the stator-side bearing member may be composed of only a cylindrical portion.

The spindle motor is then assembled into a disk drive unit with a cover mounted in a manner to remain in abutment on an upper end of the cylindrical portion composing the support column. Because of this structure, there is not a chance for the cover to come into contact to any of rotating components of the spindle motor even if the cover is pressed by a force applied externally, since the cover is supported at a portion of the abutment with the upper end of the cylindrical portion of the support column. This structure also prevents the rotor-side bearing member, i.e., the rotor hub, from slipping out of the stator-side bearing member, and the disk from colliding hardly against the signal conversion element (e.g., magnetic head, optical head, and the like) for recording and reproducing data in the recording layer, even when it receives any impacts caused by excessive vibrations, fall, and the like. The invention can thus realize the spindle motor for producing a disk drive unit of a simple structure and outstanding resistance to shocks.

Also, in order to achieve the above object, the spindle motor of this invention has a structure in which the chassis has a protruding portion in an area around the cylindrical portion of the support column, and a height of the protruding portion is greater than a height of the stator-side bearing member. In addition, the protruding portion of the chassis is formed into such a shape that a part of the protruding portion extending beyond the upper end of the stator-side bearing member is tapered so that a diameter of that part becomes smaller the more the protruding portion extends above the upper end of the bearing member.

This structure can prevent the hydrodynamic lubricant that functions as the fluid bearing from dispersing for some reasons.

Moreover, to achieve the above object, the spindle motor of this invention has the support column provided with a threaded portion in the upper end of the cylindrical portion.

This structure prevents the cover from lifting off the upper end of the support column even if the rotor hub carrying the disk collides hard against the side of the cover due to some external factors such as a very strong shock and the like. The invention can thus suppress the hard collision of the disk and the signal conversion element, and realize the spindle motor for producing a disk drive unit of outstanding resistance to shocks with the simple structure.

In order to achieve the above object, a disk drive unit of this invention has a spindle motor comprising a chassis, a rotor magnet, a rotor-side bearing member, a rotor hub having a hollow circular opening arranged in the center of rotation, a support column attached to the chassis, and a stator having a wound coil and disposed to the chassis in a manner to confront the rotor magnet, wherein the support column is so placed in the chassis that it lies inside the hollow circular opening of the rotor hub, and a bearing for supporting the rotor hub and comprising a stator-side bearing member disposed to the chassis and the rotor-side bearing member is formed in a position of a certain distance from the support column. The disk drive unit also comprises a disk having a recording layer formed on the surface and placed on the upper surface of a flange portion of the rotor hub of the spindle motor, a cover having an abutment portion in abutment against one of tip ends of a cylindrical portion constituting the support column of the spindle motor, a signal conversion element for recording and reproducing data in the recording layer formed on the disk, and swing means for positioning the signal conversion element to a predetermined tracking position. In addition, the support column of the spindle motor has a threaded portion in the upper end of the cylindrical portion, and the cover has a through hole in a position within the abutment portion corresponding to the threaded portion of the support column, so that the cover is put into abutment to the upper end surface of the cylindrical portion of the support column and fixed to it with a screw in the through hole.

Furthermore, the disk drive unit of this invention is provided with any of: a structure having a fluid bearing comprising a dynamic pressure generating groove functioning as a thrust bearing formed in one of two axially confronting surfaces of the rotor-side bearing member and the stator-side bearing member, and another dynamic pressure generating groove functioning as a radial bearing formed in one of two radially confronting surfaces of the rotor-side bearing member and the stator-side bearing member; another structure provided with the rotor hub and the rotor-side bearing member formed integrally; another structure in which the support column securing the stator-side bearing member has a flat portion and the cylindrical portion made of separate materials and constructed integrally into one component; still another structure in which the chassis provided with the support column securing the stator-side bearing member and composed of only a cylindrical portion has a protruding portion in area near the cylindrical portion of the support column, and a height of the protruding portion is greater than a height of the stator-side bearing member; and yet another structure in which the protruding portion of the chassis is formed into such a shape that a part of the protruding portion extending beyond the upper end of the stator-side bearing member is tapered so that a diameter of that part becomes smaller the more the protruding portion extends above the upper end of the bearing member.

Because of the above structures, the cover does not come into sliding contact with any of the rotating members of the spindle motor to cause a variation in rotation of the spindle motor even if it receives an external force, since the abutment portion of the cover is kept in contact with the upper end of the cylindrical portion of the support column. The structures also prevent the rotor-side bearing member, i.e., the rotor hub, from slipping out of the stator-side bearing member even when it receives any impacts due to excessive vibration, fall, and the like, since they maintain a predetermined spatial dimension of the clearance between the top end of the rotor hub and the bottom surface of the abutment portion of the cover. Furthermore, these structures suppress the hard collision of the disk and the signal conversion element, and prevent the recording layer formed on the surface of the disk and the swing means for positioning the signal conversion element from being damaged irreparably, thereby realizing the superior disk drive unit with high resistance to shocks.

Moreover, these structures prevent the cover from lifting off the upper end of the support column even if the rotor hub carrying the disk collides hardly against the side of the cover due to some external factors such as a very strong shock and the like. The invention can thus suppress the hard collision of the disk and the signal conversion element, avoid the recording layer formed on the surface of the disk and the swing means for positioning the signal conversion element from being damaged irreparably, and realize the disk drive unit of outstanding resistance to shocks and high reliability.

DETAILED DESCRIPTION OF THE INVENTION

Description is provided hereinafter of exemplary embodiments of the present invention with reference to the accompanying drawings.

First Exemplary Embodiment

Figure 1:
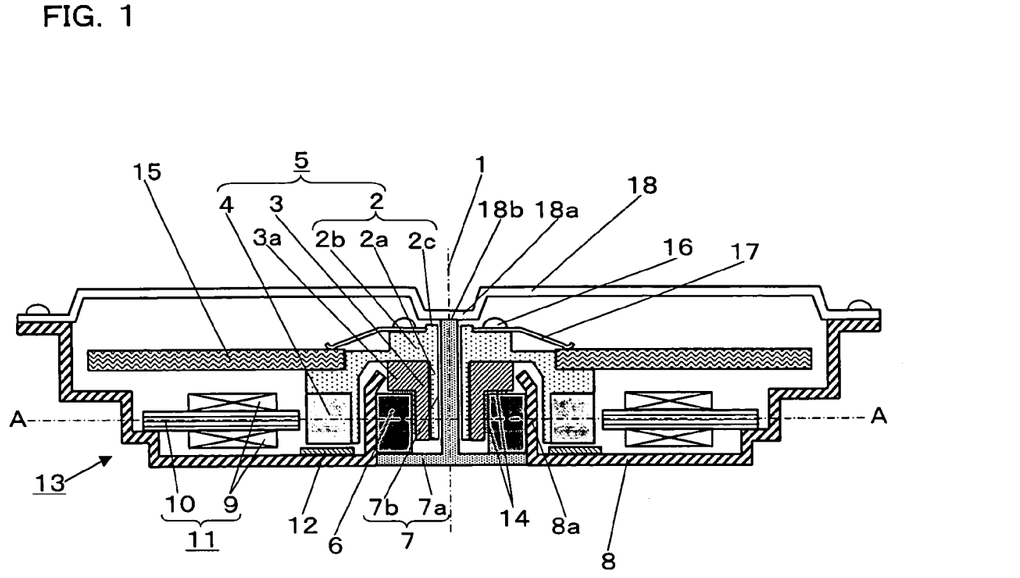
FIG. 1 is a sectioned side view showing a general structure of major components of a disk drive unit equipped with a spindle motor according to a first exemplary embodiment of the present invention.
Figure 2:
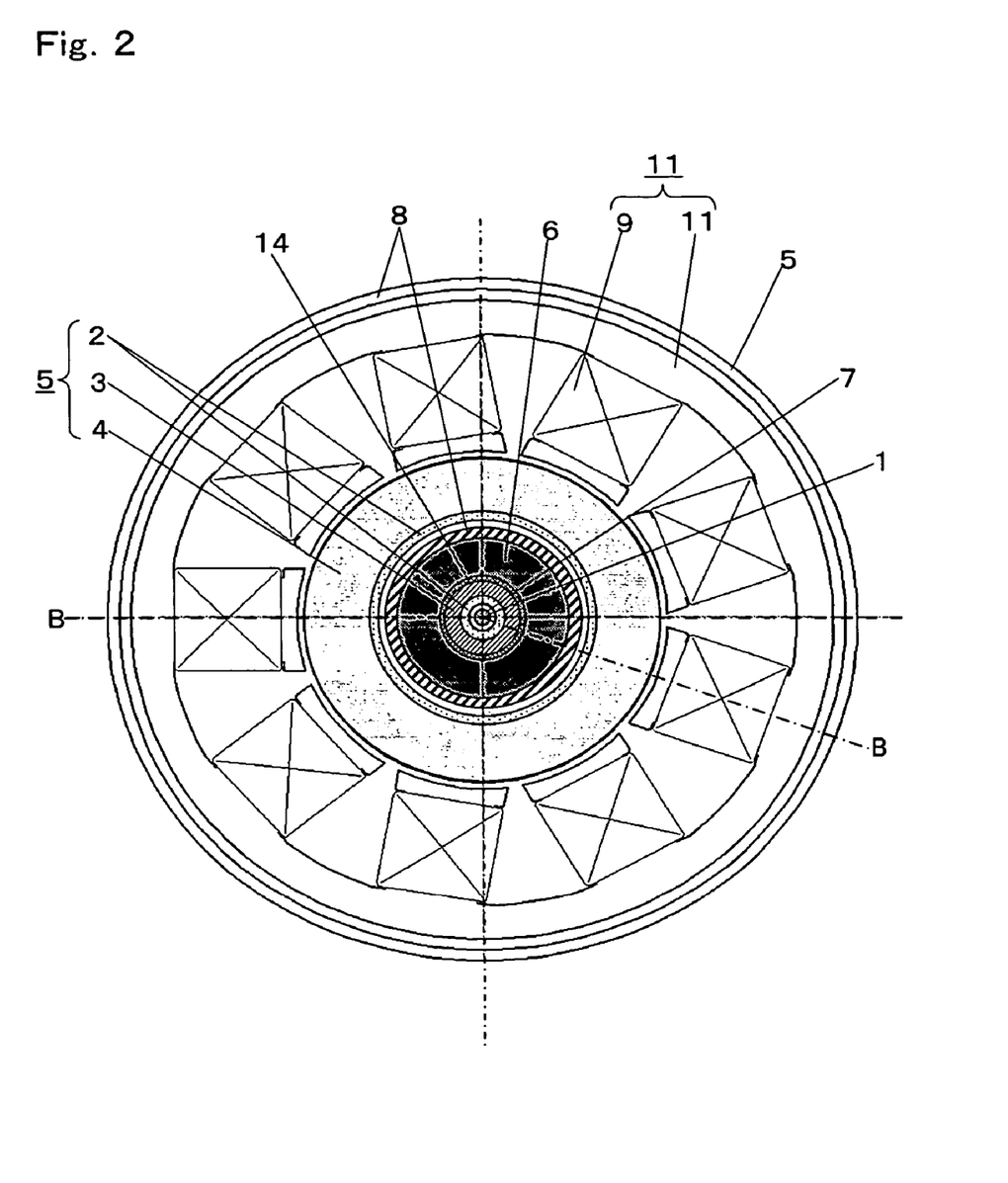
FIG. 2 is a sectioned plan view showing the general structure of major components of the disk drive unit equipped with the spindle motor according to the first exemplary embodiment of the present invention.

FIG. 1 and FIG. 2 are drawings for use in connection with the following description of a spindle motor and a disk drive unit equipped with the same, according to the first exemplary embodiment of this invention. FIG. 1 is a sectioned side view showing a general structure of major components of a disk drive unit equipped with a spindle motor according to the first exemplary embodiment of the present invention, and FIG. 2 is a sectioned plan view also showing the general structure of major components of the disk drive unit equipped with the spindle motor according to the first exemplary embodiment of the present invention. FIG. 1 shows a sectional view taken along a line B-B in FIG. 2, and FIG. 2 shows another sectional view taken along a line A-A in FIG. 1.

In FIG. 1 and FIG. 2, rotor hub 2 to be rotated about central axis 1 of rotation has hollow cylinder portion 2a provided with a circular hole bored around the central axis 1, and an outer periphery of this hollow cylinder portion 2a having the circular hole is provided with rotor-side bearing member 3 secured to it by press-fitting, bonding, or the like method. Rotor hub 2 is also provided with rotor magnet 4 having a plurality of magnetized poles, which is secured to an underside surface at the periphery thereof by means of press-fitting, bonding or the like. Rotor hub 2, rotor-side bearing member 3 and rotor magnet 4 constitute rotor unit 5. Here, rotor hub 2 and rotor-side bearing member 3 need not be made as separate components, but they can be fabricated into a single component, so that the outer periphery of hollow cylinder portion 2a and the underside surface of flange portion 2b of the rotor hub 2 are used to serve as a rotor-side bearing member.

On the other hand, stator-side bearing member 6 is secured to support column 7 by bonding, welding, or the like method. Support column 7 is secured to chassis 8 by press-fitting, bonding, or the like method in a position coaxial with the central axis 1 of the rotation, so that when the rotor hub 2 is placed over the support column 7 there is a certain clearance between the support column 7 and the inner wall of the circular hole in the hollow cylinder portion 2a, to allow the rotor hub 2 freely rotatable without coming into contact with the support column 7. In this embodiment, support column 7 needs not be a unitary fabricated component comprising flat portion 7a and cylindrical portion 7b, as shown in FIG. 1, but it may be formed integrally from separate parts of flat portion 7a and cylindrical portion 7b. Stator 11 comprises coil 9 wound around each of a plurality of pole vanes of stator core 10, and it is secured to chassis 8 in a manner that inner peripheral ends of the plurality of pole vanes confront the outer periphery of rotor magnet 4 bonded to rotor hub 2. Thrust attracting plate 12 made of a soft magnetic material is secured to chassis 8 by such means as bonding in a position facing the lower side of rotor magnet 4, so that rotor magnet 4 and thrust attracting plate 12 attract each other by a magnetic attractive force acting therebetween. The above components thus constitute spindle motor 13.

Rotor-side bearing member 3 secured to rotor hub 2 is provided with flange 3a protruding from the outer periphery. Rotor-side bearing member 3 is constructed into such a shape that an underside surface of flange 3a and a part of the outer periphery below the flange 3a confront the upper end and an inner surface respectively, of stator-side bearing member 6 secured to support column 7. One of the underside surface of flange 3a and the upper end of stator-side bearing member 6, i.e. the axially confronting surfaces of rotor-side bearing member 3 and stator-side bearing member 6, has a dynamic pressure generating groove formed therein. In addition, one of the outer periphery of rotor-side bearing member 3 below the flange 3a and the inner surface of stator-side bearing member 6, i.e. the radially confronting surfaces of rotor-side bearing member 3 and stator-side bearing member 6, has another dynamic pressure generating groove formed therein. A clearance formed between the underside surface of flange 3a and the upper end of stator-side bearing member 6 and another clearance formed between the outer periphery of rotor-side bearing member 3 below the flange 3a and the inner surface of stator-side bearing member 6 are filled with hydrodynamic lubricant 14 such as ester base synthetic oil. This structure formed between the underside surface of flange 3a and the upper end of stator-side bearing member 6 functions as a thrust bearing, and another structure formed between the outer periphery of rotor-side bearing member 3 below the flange 3a and the inner surface of stator-side bearing member 6 functions as a radial bearing. These two bearings thus constitute a so-called shaft-rotating type fluid bearing. The dynamic pressure generating groove functioning as the radial fluid bearing may be formed into a shape of herringbone pattern of the well-known art, and the other dynamic pressure generating groove functioning as the thrust bearing may be formed into such a configuration as spiral pattern that produces a pumping effect in the flow of hydrodynamic lubricant 14 toward central axis 1 of the rotation, to thereby prevent hydrodynamic lubricant 14 from leaking out of the bearings.

When an electric current is supplied to coil 9, rotor magnet 4 or rotor hub 2 starts rotating, as is known well. Accordingly, the rotation of rotor-side bearing member 3 generates a dynamic pressure in hydrodynamic lubricant 14 in the radial direction as well as the axial direction of stator-side bearing member 6 and rotor-side bearing member 3, thereby achieving smooth rotation of rotor hub 2 about the central axis 1.

Figure 3:
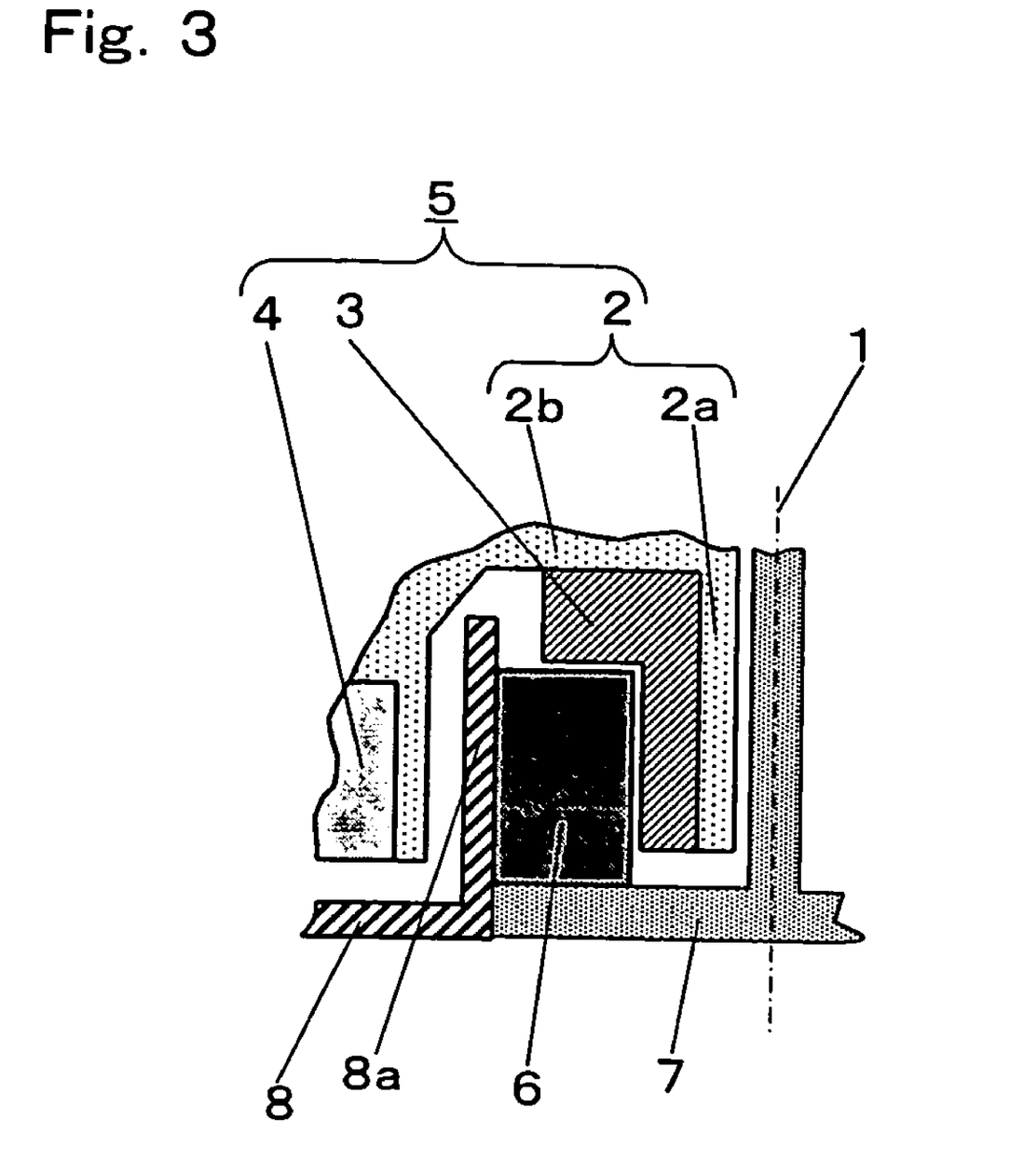
FIG. 3 is a sectional view of a part of the disk drive unit equipped with the spindle motor, showing another example of a protruding portion of a chassis according to the first exemplary embodiment of the present invention.

Chassis 8 has protruding portion 8a near the central axis 1, and any of support column 7 and stator-side bearing member 6 is secured to this protruding portion 8a by press-fitting, bonding or the like method. Furthermore, protruding portion 8a of chassis 8 is formed into a height equal to or greater than a height of the underside surface of flange 3a of rotor-side bearing member 3, in the state that rotor hub 2 is rotated and rotor-side bearing member 3 is lifted by the effect of the dynamic pressure generating groove formed in any of the underside surface of flange 3a of rotor-side bearing member 3 and the upper end of stator-side bearing member 6. In addition, protruding portion 8a of chassis 8 is formed into such a shape that an upper part of protruding portion 8a extending beyond the upper end of the stator-side bearing member 6 is tapered so that a diameter of that part becomes smaller the more the protruding portion extends above the upper end of the bearing member 6. However, protruding portion 8a of chassis 8 may be formed into a straight cylindrical shape as illustrated in FIG. 3, which is a partial sectional view showing another example of protruding portion of the chassis 8.

Figure 4:
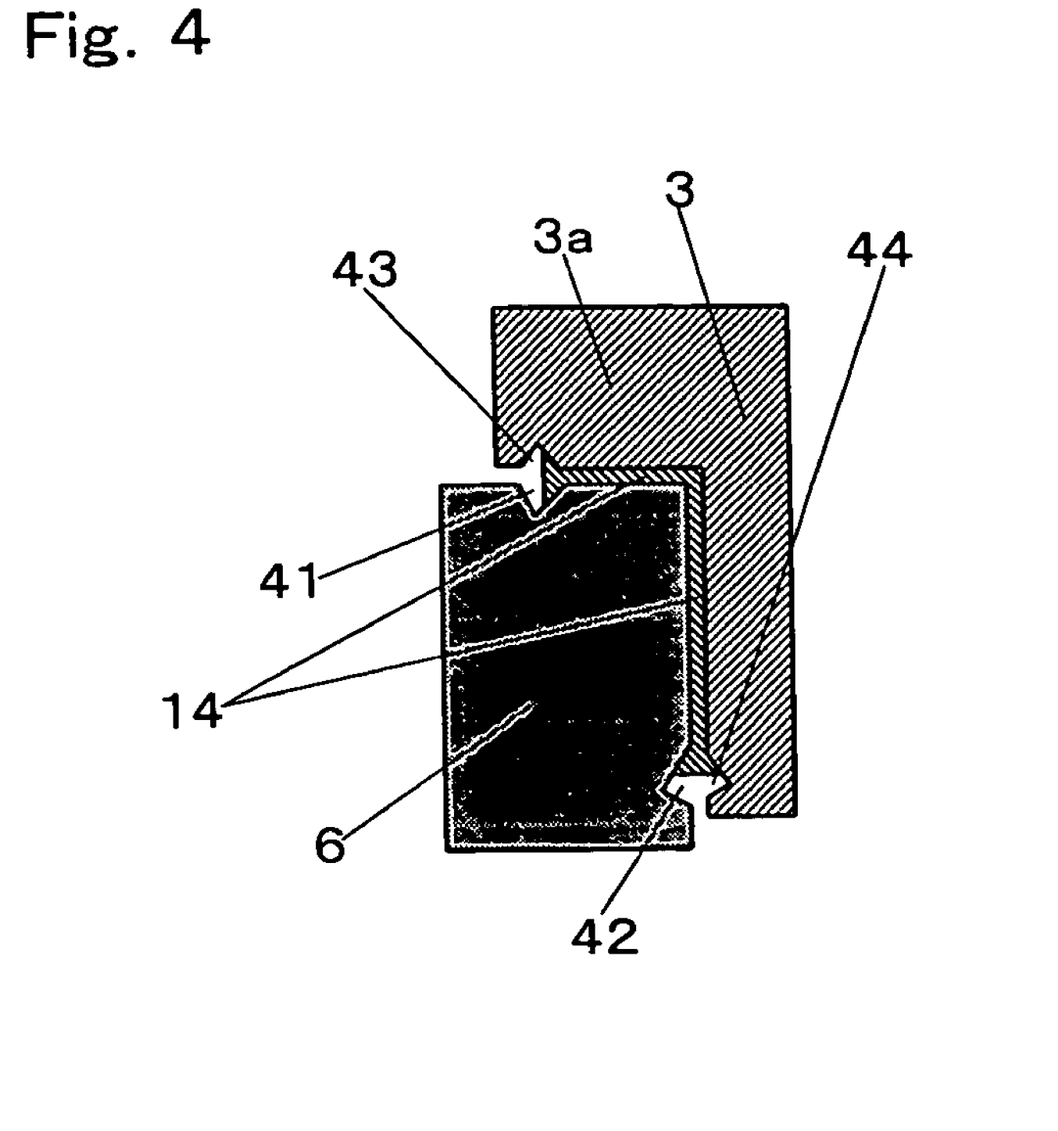
FIG. 4 is an enlarged sectional view of a part of the disk drive unit equipped with the spindle motor, showing a shape of lubricant reserving groove according to the first exemplary embodiment of the present invention.

The structure described above prevents hydrodynamic lubricant 14 contained in the bearing space between the underside surface of flange 3a of rotor-side bearing member 3 and the upper end of stator-side bearing member 6 from dispersing during rotation of rotor hub 2 due to adverse effects of some external causes. In addition, rotor-side bearing member 3 is provided with lubricant reserving grooves 43 and 44 of generally a triangular shape in cross-section in the underside surface at an edge of flange 3a and in a lower peripheral surface below flange 3a, and stator-side bearing member 6 is also provided with lubricant reserving grooves 41 and 42 of generally similar triangular shape in the upper end surface (i.e., at a location facing the edge of the underside surface of flange 3a of rotor-side bearing member 3) and the inner peripheral surface (i.e., at a location facing the lower peripheral surface below flange 3a of rotor-side bearing member 3), as illustrated in FIG. 4, which is an enlarged partial sectional view showing the shape of the lubricant reserving grooves as an example. When hydrodynamic lubricant 14 is charged between lubricant reserving groove 43 in the underside surface of flange 3a and the other lubricant reserving groove 44 in the lower peripheral surface below flange 3a, these grooves can prevent the hydrodynamic lubricant 14 from flowing out of the bearing space because of the effects of its viscosity and surface tension. In this structure, the lubricant reserving grooves 43 and 44 may be omitted from the surfaces of rotor-side bearing member 3.

Disk 15 provided with a recording layer (not shown, may be called a layer or a film of recording medium) formed on the surface is placed on flange portion 2b of rotor hub 2, and secured to it by flexibility of disk retaining member 17 fixed with screw 16 to rotor hub 2, so that disk 15 is rotatable with rotation of rotor hub 2.

It is needless to note that a signal conversion element (such as a magnetic head, optical head and the like, although not shown in the figures) for recording and reproducing data in the recording layer formed on disk 15 is provided in a manner to face the disk 15 via swing means (such as a suspension, optical pick-up carrier and the like, although not shown) for positioning the signal conversion element along a predetermined track using the well-known method.

Cover 18 is then placed in a manner that a lower side of abutment portion 18b on protruded portion 18a is in abutment against the upper end surface of cylindrical portion 7b of support column 7, and secured to chassis 8 or an enclosure case (not shown) with a screw or the like, so that there is a small clearance between upper end 2c of rotor hub 2 and the lower side of abutment portion 18b of cover 18. Accordingly, the disk drive unit comprises disk 15, spindle motor 13 and cover 18.

A height of upper end 2c of rotor hub 2 during rotation of rotor hub 2 is the sum of a height of stator-side bearing member 6, a thickness of flange 3a of rotor-side bearing member 3, a thickness of rotor hub 2 and a height of rotor hub 2 lifted by hydrodynamic lubricant 14 in the thrust bearing. The height of stator-side bearing member 6, the thickness of flange 3a of rotor-side bearing member 3 and the thickness of rotor hub 2 are relatively easy to control as physical dimensions, and the lifting height of rotor hub 2 is a calculable value because the dynamic pressure generating groove is designed to obtain a necessary amount of the lift by the thrust bearing. On the other hand, a height of cylindrical portion 7b of support column 7 can also be controlled easily as a physical dimension. Therefore, it is relatively easy to provide a given amount of clearance between upper end 2c of rotor hub 2 and the lower side of abutment portion 18b of cover 18, since abutment portion 18b of cover 18 is kept in abutment against the upper end of cylindrical portion 7b. Accordingly, it is quite possible to set the clearance between upper end 2c of rotor hub 2 and the lower side of abutment portion 18b of cover 18 to a very small predetermined amount. When the lower side of abutment portion 18b of cover 18 is placed in abutment to the upper end of cylindrical portion 7b of support column 7 with the clearance set to a very small amount between upper end 2c of rotor hub 2 and the lower side of abutment portion 18b of cover 18, the result is a structure in which cover 18 does not come into contact to any rotating member of spindle motor 13, even if cover 18 receives an external force such as a hand in depressing contact to cover 18, since abutment portion 18b of it is in abutment to the upper end of cylindrical portion 7b of support column 7.

In addition, rotor hub 2 carrying disk 15 is not likely to be lifted by the normal vibrations, shocks and the like because of the attractive force of rotor magnet 4 to thrust attracting plate 12 secured to chassis 8. Thrust attracting plate 12 may be omitted when chassis 8 is constructed of a magnetic material which produces a sufficiently large magnetic attraction between chassis 8 and rotor magnet 4.

Moreover, rotor-side bearing member 3, or rotor hub 2, does not slip off the stator-side bearing member 6 even if it receives shocks such as excessive vibrations, fall and the like impacts. In addition, the structure in which the lower side of abutment portion 18*b* of cover 18 is kept in abutment against the upper end of cylindrical portion 7*b* of support column 7 limits a magnitude of the movement of rotor hub 2 to very small. This structure can therefore prevent the surface of disk 15 where the recording layer is formed and the signal conversion element for recording and reproducing data in the recording layer on disk 15 from being damaged irreparably because of no hard collision between disk 15 placed on flange portion 2*b* of rotor hub 2 and the signal conversion element. It can also prevent the swing means from being damaged irreparably.

It is needless to note that the lower side of abutment portion 18*b* of cover 18 is so formed as to have an area larger than that of the circular hole in rotor hub 2.

When a diameter of support column 7 and an inner diameter of the circular hole in the hollow cylinder portion 2*a* of rotor hub 2 are formed sufficiently small, a radius of cylinder portion 2*a* of rotor hub 2 facing the lower end surface of abutment portion 18*b* of cover 18 can be reduced to prevent an adverse effect to the rotation of disk 15, even if upper end 2*c* of rotor hub 2 comes into sliding contact with the lower end surface of abutment portion 18*b* due to lifting of rotor hub 2 by some external factors.

The above structure, in which support column 7 is inserted into the circular hole in hollow cylinder portion 2*a* of rotor hub 2, can increase an effective radius of the thrust fluid bearing comprising the underside surface of flange 3*a* of rotor-side bearing member 3 and the confronting upper end surface of stator-side bearing member 6 as measured from the central axis 1 of the rotation, as compared to the thrust fluid bearing comprising the rotor shaft and the thrust plate in the spindle motor of the prior art described above. This increases a rigidity of the thrust fluid bearing, and therefore reduces an axial length of the radial fluid bearing comprising the outer periphery of rotor-side bearing member 3 and the confronting inner surface of stator-side bearing member 6 along central axis 1 of the rotation. The above structure can thus reduce a thickness of spindle motor 13 and hence the disk drive unit.

Figure 5:
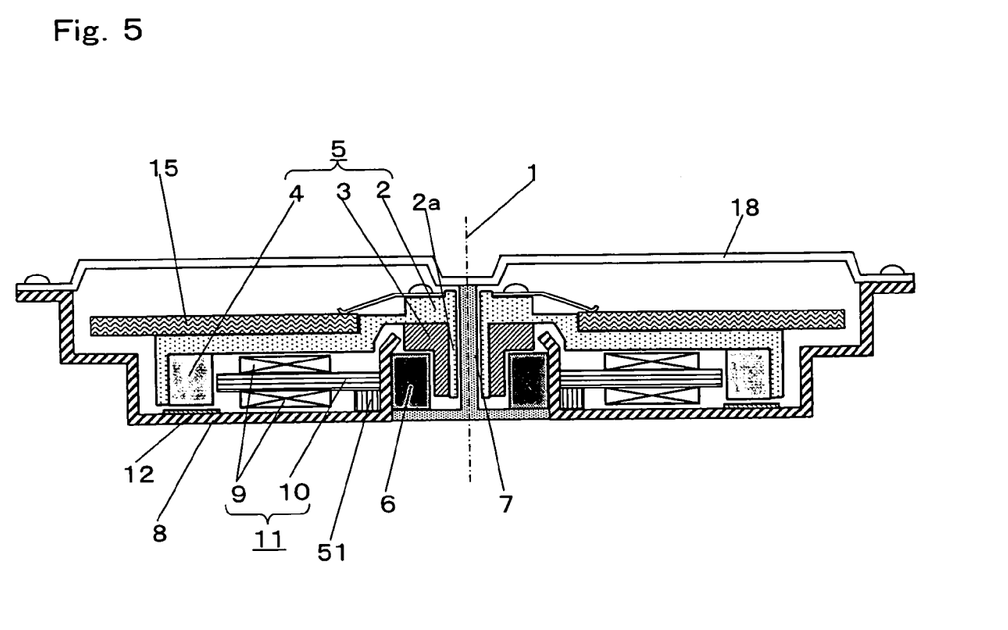
FIG. 5 is a sectioned side view showing a general structure of major components of another example of spindle motor provided in the disk drive unit according to the first exemplary embodiment of the present invention.

Although the spindle motor of the first exemplary embodiment, as discussed above relates to a so-called radial gap type inner rotor motor, this invention is not restrictive and that the invention can be applied to and practiced in a structure of any of the so-called radial gap type outer rotor motor. FIG. 5 shows one example of the radial gap type outer rotor motor used for the disk drive unit of the first exemplary embodiment of this invention. In FIG. 5, like reference numerals are used to designate the same element and the same name of components as those of FIG. 1 described above. Stator 11 having coil 9 wound around stator core 10 is secured to chassis 8 by using mounting member 51 in a manner that an outer periphery of it confronts an inner periphery of rotor magnet 4 fixed to rotor hub 2. A structure of this motor in which support column 7 is inserted into a circular hole in hollow cylinder portion 2*a* of rotor hub 2, and other structures are analogous to those of the previous motor described in this exemplary embodiment, and their details are therefore skipped.

In the disk drive unit equipped with the spindle motor according to the first exemplary embodiment of this invention, as described above, the cover does not come into sliding contact with any of the rotating members of the spindle motor to cause a variation in rotation of the spindle motor even if it receives an external force, since the abutment portion of the cover is kept in contact with the upper end of the cylindrical portion of the support column. This structure also prevents the rotor-side bearing member, or the rotor hub, from slipping out of the stator-side bearing member even when it receives any impacts due to excessive vibrations, fall, and the like, since it maintains the predetermined spatial dimension of the clearance between the top end of the rotor hub and the bottom surface of the abutment portion of the cover by way of precisely controlling the physical dimensions of the rotor hub, the rotor-side bearing member, the stator-side bearing member and the support column. Furthermore, this structure suppresses hard collision of the disk and the signal conversion element, and prevents the recording layer formed on the surface of the disk and the swing means for positioning the signal conversion element from being damaged irreparably, thereby realizing a superior spindle motor of low profile having high resistance to shocks, high reliability and suitable for a disk drive unit.

This invention also realizes a disk drive unit of very high resistance to shocks when the disk drive unit is equipped with the spindle motor of the above structure.

Second Exemplary Embodiment

Figure 6:
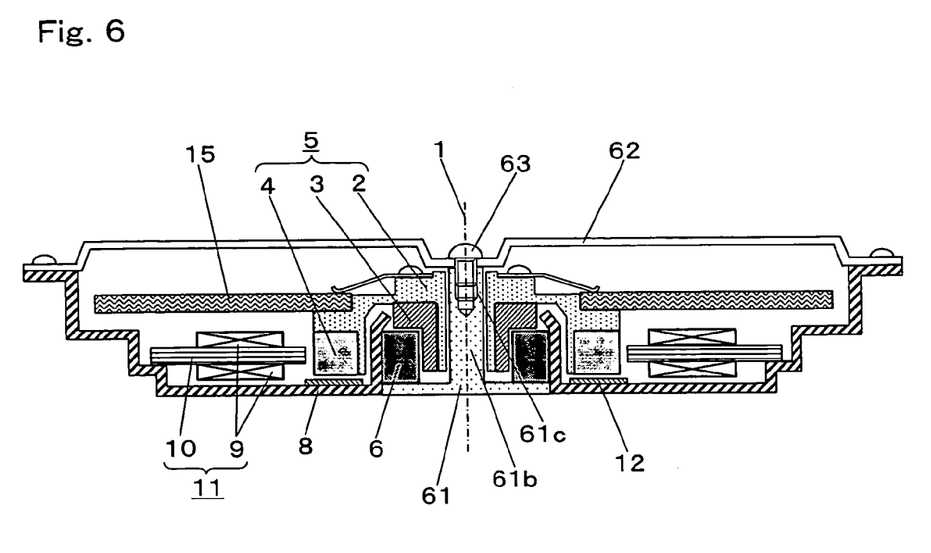
FIG. 6 is a sectioned side view showing a general structure of major components of a disk drive unit equipped with a spindle motor according to a second exemplary embodiment of the present invention.

FIG. 6 is a drawing for use in connection with the following description of a spindle motor and a disk drive unit equipped with the same according to the second exemplary embodiment of this invention. FIG. 6 is a sectioned side view showing a general structure of major components of a disk drive unit equipped with a spindle motor of the second exemplary embodiment of the present invention, wherein the disk drive unit is sectioned along a plane including the central axis of rotation. In FIG. 6, like reference numerals are used to designate the same element and the same name of components as those of FIG. 1 described above, and repeat of description is therefore avoided.

The disk drive unit shown in FIG. 6 differs from that of the above-described first exemplary embodiment in respects that support column 61 is provided with female thread 61*c* in the center of an upper end of cylindrical portion 61*b*, cover 62 has a through hole in a position corresponding to female thread 61*c*, and cover 62 is secured to support column 61 with cover fixing screw 63 inserted in the through hole of cover 62 and tightened into female thread 61*c* in support column 61. Other structures are analogous to those of the previously described first exemplary embodiment, and their details are therefore skipped.

According to the second exemplary embodiment of this invention, as described, the spindle motor has cover 62 secured to support column 61 with a screw to prevent the cover from lifting off the upper end of the support column even if a rotor hub carrying a disk collides hardly against the side of the cover due to some external factors such as a very strong shock and the like. This structure can thus suppress the hard collision of the disk and the signal conversion element, in the same manner as the above-described first exemplary embodiment, avoid a recording layer formed on the surface of the disk and swing means for positioning the signal conversion element from being damaged irreparably, and realize a superior spindle motor having high resistance to shocks, high reliability and suitable for a disk drive unit.

Third Exemplary Embodiment

Figure 7:
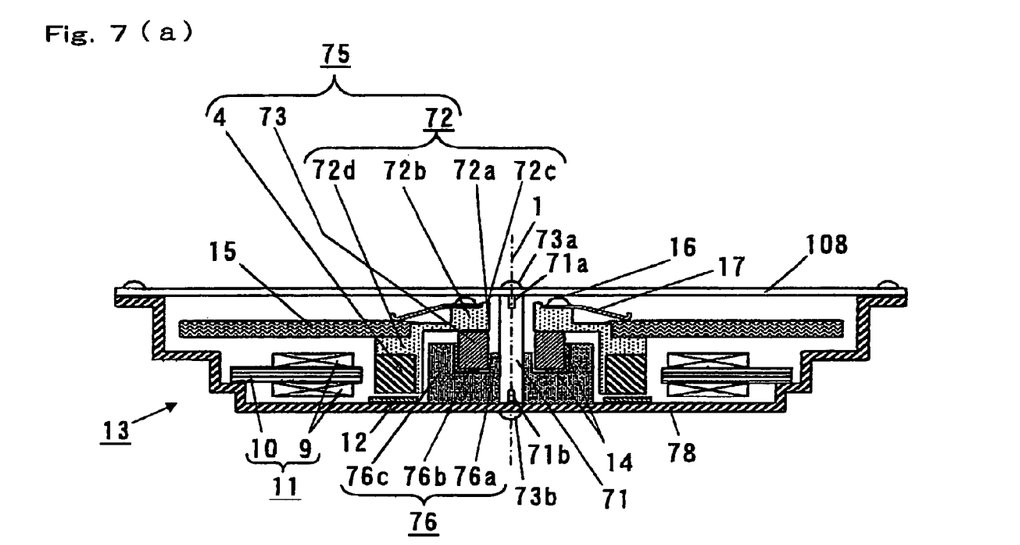
FIG. 7(a) is a sectioned side view showing a general structure of major components of a disk drive unit equipped with a spindle motor according to a third exemplary embodiment of the present invention.
FIG. 7(b) is a sectioned side view showing a general structure of major components of the disk drive unit equipped with another spindle motor according to the third exemplary embodiment of the present invention.

FIG. 7 is a drawing for use in connection with the following description of a spindle motor and a disk drive unit equipped with the same according to the third exemplary embodiment of this invention.

FIG. 7(a) is a sectioned side view showing a general structure of major components of a disk drive unit equipped with a spindle motor of the third exemplary embodiment of the present invention, wherein the disk drive unit is sectioned along a plane including the central axis of rotation. In FIG. 7(a), like reference numerals are used to designate the same element and the same name of components as those of FIG. 1 and FIG. 6 described above, and repeat of description is therefore avoided.

In FIG. 7(a), rotor hub 72 to be rotated around central axis 1 of rotation has hollow circular opening 72a in a position generally coaxial to the central axis 1 (hollow circular opening 72a corresponds to the hollow cylinder portion in the first and the second exemplary embodiments). Rotor hub 72 is provided with rotor-side bearing member 73 attached to the lower end at center side 72b of it by the well-known method such as welding and bonding. Rotor hub 72 is also provided with rotor magnet 4 having a plurality of magnetized poles, which is secured to the underside surface at peripheral side 72d by such means as press-fitting, bonding or the like. Rotor hub 72, rotor-side bearing member 73 and rotor magnet 4 constitute rotor unit 75. Here, rotor hub 72 and rotor-side bearing member 73 need not be made as separate components, but they can be fabricated into a single component.

Support column 71 is formed into a cylindrical configuration in its entirety, and, unlike that of the first and the second exemplary embodiments, it is not provided with a disk-shaped plate portion at the bottom thereof. Support column 71 is provided with upper female thread 71a and lower female thread 71b at the center of both the upper end and the lower end respectively.

On the other hand, stator-side bearing member 76 has generally a hollow cylindrical shape, and it is provided with annularly shaped groove 76b formed in the upper surface between center side 76a and edge side 76c. Stator-side bearing member 76 has support column 71 which is securely fixed into a hollow space in the center thereof by such well-known method as press fitting or bonding. Both stator-side bearing member 76 and support column 71 are positioned to be in coaxial with central axis 1 of the rotation. Rotor-side bearing member 73 attached to rotor hub 72 is inserted in the annularly shaped groove 76b with a clearance and not in contact to each other so that it is freely rotatable about central axis 1 of the rotation. Here, support column 71 and stator-side bearing member 76 may be formed unitary with a single material instead of using separate materials and assembling them into one unit as shown in FIG. 7(a).

Furthermore, stator 11 comprising coils 9 wound around a plurality of pole vanes of stator core 10 is secured to chassis 78 in a manner that inner peripheral ends of the pole vanes confront the outer periphery of rotor magnet 4 bonded to rotor hub 72. Thrust attracting plate 12 made of a soft magnetic material is secured to chassis 78 by such means as bonding in a position facing the lower side of rotor magnet 4. The above components thus constitute spindle motor 13 in the same manner as that of the first and the second exemplary embodiments.

Rotor-side bearing member 73 attached to the bottom surface at center side 72b of rotor hub 72 is constructed into such a shape that an outer periphery and a lower end surface of it face an inner periphery at the outside and a bottom surface respectively of groove 76b formed in stator-side bearing member 76 secured to support column 71. One of the outer periphery of rotor-side bearing member 73 and the inner periphery at the outside of groove 76b in stator-side bearing member 76, i.e. the radially confronting surfaces of rotor-side bearing member 73 and stator-side bearing member 76, has a dynamic pressure generating groove formed therein. In addition, one of the lower end surface of rotor-side bearing member 73 and the bottom surface of groove 76b in stator-side bearing member 76, i.e. the axially confronting surfaces of rotor-side bearing member 73 and stator-side bearing member 76, has another dynamic pressure generating groove formed therein. A clearance formed between the outer periphery of rotor-side bearing member 73 and the inner periphery at the outside of groove 76b in stator-side bearing member 76 and another clearance formed between the lower end surface of rotor-side bearing member 73 and the bottom surface of groove 76b in stator-side bearing member 76 are filled with hydrodynamic lubricant 14 such as ester base synthetic oil. This structure formed between the outer periphery of rotor-side bearing member 73 and the inner periphery at the outside of groove 76b in stator-side bearing member 76 functions as a radial bearing, and another structure formed between the lower end surface of rotor-side bearing member 73 and the bottom surface of groove 76b in stator-side bearing member 76 functions as a thrust bearing. These two bearings thus constitute a so-called shaft-rotating type fluid bearing. The dynamic pressure generating groove functioning as the thrust bearing may be formed into such a configuration as spiral pattern that produces a pumping effect in the flow of hydrodynamic lubricant 14 toward central axis 1 of the rotation, and the other dynamic pressure generating groove functioning as the radial fluid bearing may be formed into a shape of herringbone pattern of the well-known art, to thereby prevent hydrodynamic lubricant 14 from leaking out of the bearings. In addition, lubricant reserving grooves of generally a triangular shape in cross-section, when provided as shown in FIG. 4 in the first exemplary embodiment, can prevent hydrodynamic lubricant 14 from flowing out of the bearing spaces by the effects of viscosity and surface tension of the hydrodynamic lubricant 14.

In the structure of the third exemplary embodiment of this invention shown in FIG. 7(a), chassis 78 is not provided with a protruding portion (8a), unlike those of the above-described first and second exemplary embodiments. However, since peripheral side 72d of rotor hub 72 carrying rotor magnet 4 has a portion extending downward, it prevents hydrodynamic lubricant 14 contained in the bearing space between the outer periphery of rotor-side bearing member 73 and the inner periphery at the outside of groove 76b in stator-side bearing member 76 from dispersing during rotation of rotor hub 72 due to adverse effects of some external causes.

Alternatively, the above structure may be so altered that center side 76a of stator-side bearing members 76 is further extended upward, a dynamic pressure generating groove is formed in one of the inner periphery of rotor-side bearing member 73 and the inner periphery of groove 76b at the center side of stator-side bearing member 76 where they confront each other radially, and the clearance formed between the confronting surfaces is filled with hydrodynamic lubricant 14 such as ester base synthetic oil, for example, to form a radial bearing between the inner periphery of rotor-side bearing member 73 and the inner periphery of groove 76b at the center side of stator-side bearing member 76.

Therefore, when an electric current is supplied to coil 9, rotor magnet 4, i.e. rotor hub 72, starts rotating, as is known well. Accordingly, the rotation of rotor-side bearing member 73 generates a dynamic pressure in hydrodynamic lubricant 14 in the radial direction as well as the axial direction of stator-side bearing member 6 and rotor-side bearing member 3, thereby achieving smooth rotation of rotor hub 72 about the central axis 1.

FIG. 7(b) is a sectioned side view showing a general structure of major components of a disk drive unit equipped with a spindle motor of another configuration according to the third exemplary embodiment of this invention, wherein the disk drive unit is sectioned in the same manner along a plane including the central axis of rotation. In FIG. 7(b), like reference numerals are used to designate the same element and the same name of components as those of FIG. 7(a) described above, and repeat of description is therefore avoided.

The spindle motor of this configuration in the third exemplary embodiment of this invention differs from the spindle motor shown in the above FIG. 7(a) in respects of the shape and structure of rotor hub 72 and rotor-side bearing member 173 included in rotor unit 75. Firstly, rotor hub 72 to be rotated around central axis 1 of rotation has hollow circular opening 72a in coaxial to central axis 1 of rotation at the center (hollow circular opening 72a in this case also corresponds to the hollow cylinder portions in the first and the second exemplary embodiments). Rotor hub 72 is also provided with rotor-side bearing member 173 attached to the bottom end surface at center side 72b of rotor hub 72 by the well-known method such as welding and bonding, and rotor magnet 4 having a plurality of magnetized poles secured to the underside surface at peripheral side 72d of rotor hub 72 by means of press-fitting, bonding or the like. Rotor hub 72, rotor-side bearing member 173 and rotor magnet 4 constitute rotor unit 75 in the same manner as the spindle motor of FIG. 7(a). This spindle motor differs in respect that protruding portion 72e extends downward from an area between center side 72b and peripheral side 72d. Rotor-side bearing member 173 also differs from the spindle motor shown in FIG. 7(a) in respect that it is provided with flange 173a extending from the outer periphery thereof. This configuration of rotor-side bearing member 173 having flange 173a is same as the structure of the spindle motors described in the first and the second exemplary embodiments. Here, rotor hub 72 and rotor-side bearing member 173 need not be made as separate components, but they can be fabricated into a single component, as can be applied to this configuration of the spindle motor shown in FIG. 7(b).

According to the spindle motor of the configuration shown in FIG. 7(b) in this third exemplary embodiment of the invention, rotor-side bearing member 173 is constructed into such a shape that a lower side surface of flange 173a and an outer periphery of it below flange 173a face an upper end surface and an inner periphery of groove 76b at edge side 76c of stator-side bearing member 76. One of the lower side surface of flange 173a of rotor-side bearing member 173 and the upper end surface of edge side 76c of stator-side bearing member 76, i.e. the axially confronting surfaces of rotor-side bearing member 173 and stator-side bearing member 76, has a dynamic pressure generating groove formed therein. In addition, one of the outer periphery of rotor-side bearing member 173 below flange 173a and the inner periphery of groove 76b at the outer peripheral side of stator-side bearing member 76, i.e. the radially confronting surfaces of rotor-side bearing member 173 and stator-side bearing member 76, has another dynamic pressure generating groove formed therein. A clearance formed between the lower side surface of flange 173a of rotor-side bearing member 173 and the upper end surface of edge side 76c of stator-side bearing member 76 and another clearance formed between the outer periphery of rotor-side bearing member 173 below flange 173a and the inner periphery of groove 76b at the outer peripheral side of stator-side bearing member 76 are filled with hydrodynamic lubricant 14 such as ester base synthetic oil, for example. The structure formed between the lower side surface of flange 173a of rotor-side bearing member 173 and the upper end surface of edge side 76c of stator-side bearing member 76 functions as a radial bearing, and another structure formed between the outer periphery of rotor-side bearing member 173 below flange 173a and the inner periphery of groove 76b at the outer peripheral side of stator-side bearing member 76 functions as a thrust bearing. These two bearings thus constitute a so-called shaft-rotating type fluid bearing in the like manner as those of the above-described first and second exemplary embodiments.

Protruding portion 72e extending downward from the area between center side 72b and peripheral side 72d of rotor hub 72 has an advantageous effect of preventing hydrodynamic lubricant 14 contained in the bearing space between the lower side surface of flange 173a of rotor-side bearing member 173 and the upper end surface of edge side 76c of stator-side bearing member 76 from dispersing during rotation of rotor hub 72 due to adverse effects of some external causes.

The spindle motor of this configuration shown in FIG. 7(b) in the third exemplary embodiment of this invention is similar to the configuration of the other spindle motor shown in FIG. 7(a) except for the structure described above. Further details of the structure of this spindle motor shown in FIG. 7(b) in the third exemplary embodiment of this invention will be skipped, to avoid duplication.

In any of the spindle motors shown in FIG. 7 and described in the third exemplary embodiment of this invention, there are formed annularly shaped protruding portion 72c having a raised surface in the centermost area and an inner-side flat portion on the upper surface of rotor hub 72 at peripheral side 72d which forms a flange portion. Disk 15 provided with a recording layer (not shown, may be called a recording film) formed on its surface is placed on an outer-side flat portion around peripheral side 72d, and secured to the upper surface of peripheral side 72d, or the flange portion, of rotor hub 72 by flexibility of disk retaining member 17 fixed with screw 16, so that disk 15 is rotatable by rotation of rotor hub 72.

It is needless to note that a signal conversion element (such as a magnetic head, optical head and the like, although not shown in the figures) for recording and reproducing data in the recording layer formed on disk 15 is provided in a position facing the disk 15 via swing means (such as a suspension, optical pick-up carrier and the like, although not shown) for positioning the signal conversion element along a predetermined track using the well-known method.

Cover 108 has a through hole in a position corresponding to upper female thread 71a in support column 71, and is secured to support column 71 with cover fixing screw 73a inserted in the through hole of cover 108 and tightened into upper female thread 71a. In addition, chassis 78 or an enclosure case (not show) has another through hole in a position corresponding to lower female thread 71b, and is secured to support column 71 with chassis fixing screw 73b inserted in the through hole of chassis 78 and tightened into lower female thread 71b in support column 71. At the same time, cover 108 is securely fastened to chassis 78 or the enclosure case (not show) by using a screw or the like means, while maintaining a small clearance between annularly shaped protruding portion 72c located at center side 72b of rotor hub 72 and cover 108. This completes the disk drive unit comprising disk 15, spindle motor 13 and cover 108.

According to the third exemplary embodiment of this invention as described, the spindle motor has cover 108 secured to support column 71 with a screw to prevent the cover from lifting off the upper end of the support column even if the rotor hub carrying the disk collides hardly against the side of the cover due to some external factors such as a very strong shock and the like. This structure can thus suppress the hard collision of the disk and the signal conversion element, in the same manner as the above-described first and second exemplary embodiments, avoid a recording layer formed on the surface of the disk as well as the swing means for positioning the signal conversion element from being damaged irreparably, and thereby it realizes the superior spindle motor having high resistance to shocks, high reliability and suitable for a disk drive unit.

In the first, second and third exemplary embodiments, although what have been described are various structures of the radial gap type cored motor, the embodiments described herein are illustrative and not restrictive, and that the invention may be practiced in still other ways. Therefore, the invention can be embodied in axial-gap type cored motors and coreless motors, for example.

As described above, the present invention can realize superior spindle motor and disk drive unit having high resistance to shocks and high reliability having advantages of preventing the rotor-side bearing member or the rotor hub from slipping out of the stator-side bearing member even if it receives hard shocks such as excessive vibrations, fall and other impacts, suppressing hard collision between the disk and the signal conversion element due to lifting of the rotor hub, and avoiding the recording layer formed on the surface of the disk as well as the swing means for positioning the signal conversion element from being damaged irreparably. The spindle motor is thus useful as a head suspending device for any of magnetic recording and reproducing devices, magneto-optical disk devices, optical disk drives and the like to be adapted to a variety of information processing units for recording and reproducing data in high density.

What is claimed is:

1. A spindle motor comprising:
   a chassis;
   a rotor magnet;
   a rotor-side bearing member;
   a stator-side bearing member;
   a rotor hub having a hollow circular hole and disposed to the center of rotation;
   a support column secured to the chassis; and
   a stator armature having a wound coil and disposed to the chassis in a position confronting the rotor magnet;
   wherein the support column is disposed to the chassis in a manner to pass through the hollow circular hole in the rotor hub;
   wherein the chassis has a protruding portion in an area around the support column, and a height of the protruding portion is greater than a height of the stator-side bearing member; and
   wherein the rotor-side bearing member, in combination with the stator-side bearing member disposed to the chassis, forms a fluid bearing for supporting the rotor hub,
   wherein the support column, the rotor-side bearing member, the stator-side bearing member and the protruding portion are disposed in this order from a central axis, and the protruding portion is disposed outside the fluid bearing.

2. The spindle motor according to claim 1, wherein the fluid bearing comprises:
   a thrust bearing having a dynamic pressure generating groove formed in any of two axially confronting surfaces of the rotor-side bearing member and the stator-side bearing member, and
   a radial bearing having another dynamic pressure generating groove formed in any of two radially confronting surfaces of the rotor-side bearing member and the stator-side bearing member.

3. The spindle motor according to claim 1, wherein the rotor hub and the rotor-side bearing member are made of a single material and formed integrally.

4. The spindle motor according to claim 1, wherein the support column retaining the stator-side bearing member comprises a flat portion and a cylindrical portion, and the flat portion and the cylindrical portion are made of separate pieces and assembled into a unit.

5. The spindle motor according to claim 4, wherein the support column has a threaded portion in a tip end of the cylindrical portion.

6. The spindle motor according to claim 1, wherein the support column retaining the stator-side bearing member comprises only a cylindrical portion.

7. The spindle motor according to claim 1, wherein the protruding portion of the chassis is formed into a shape that a part of the protruding portion extending beyond an upper end of the stator-side bearing member is tapered so that a diameter of the part becomes smaller the more the protruding portion extends above the upper end of the bearing member.

8. A disk drive unit provided with a spindle motor, the spindle motor comprising:
   a chassis;
   a rotor magnet;
   a rotor-side bearing member;
   a stator-side bearing member;
   a rotor hub having a hollow circular hole and disposed to the center of rotation;
   a support column secured to the chassis; and
   a stator having a wound coil and disposed to the chassis in a position confronting the rotor magnet;
   wherein the support column is disposed to the chassis in a manner to pass through the hollow circular hole in the rotor hub;
   the disk drive unit further comprising:
   a disk having a recording layer formed on a surface thereof, and disposed to an upper surface of a flange portion of the rotor hub in the spindle motor;
   a cover having an abutment portion in abutment on one of tip ends of the cylindrical portion constituting the support column in the spindle motor;
   a signal conversion element for recording and reproducing data in the recording layer formed on the disk; and
   a swing member for positioning the signal conversion element to a predetermined tracking position;

wherein the chassis has a protruding portion in an area around the support column, and a height of the protruding portion is greater than a height of the stator-side bearing member; and wherein the rotor-side bearing member, in combination with the stator-side bearing member disposed to the chassis, forms a fluid bearing for supporting the rotor hub, wherein the support column, the rotor-side bearing member, the stator-side bearing member and the protruding portion are disposed in this order from a central axis, and the protruding portion is disposed outside the fluid bearing.

9. The disk drive unit according to claim 8, wherein:

the support column of the spindle motor has a threaded portion in a tip end of the cylindrical portion;

the cover is provided with a through hole in a position of the abutment portion corresponding to the threaded portion of the support column; and the cover is held in abutment on and secured to the tip end of the cylindrical portion of the support column with a screw in the through hole of the cover.

10. The disk drive unit according to claim 8, wherein the fluid bearing comprises:

a thrust bearing having a dynamic pressure generating groove formed in any of two axially confronting surfaces of the rotor-side bearing member and the stator-side bearing member; and a radial bearing having another dynamic pressure generating groove formed in any of two radially confronting surfaces of the rotor-side bearing member and the stator-side bearing member.

11. The disk drive unit according to claim 8, wherein the rotor hub and the rotor-side bearing member are made of a single material and formed integrally.

12. The disk drive unit according to claim 8, wherein the support column retaining the stator-side bearing member comprises a flat portion and a cylindrical portion, and the flat portion and the cylindrical portion are made of separate pieces and assembled into a unit.

13. The disk drive unit according to claim 8, wherein the support column retaining the stator-side bearing member comprises only a cylindrical portion.

14. The disk drive unit according to claim 8, wherein the protruding portion of the chassis is formed into a shape that a part of the protruding portion extending beyond an upper end of the stator-side bearing member is tapered so that a diameter of the part becomes smaller the more the protruding portion extends above the upper end of the bearing member.

* * * * *